(12) United States Patent
Gundrum

(10) Patent No.: US 7,433,412 B2
(45) Date of Patent: Oct. 7, 2008

(54) DIGITAL SUBSCRIBER LINE INDUCTION NEUTRALIZING TRANSFORMER NETWORK

(75) Inventor: Russell P. Gundrum, Kingwood, TX (US)

(73) Assignee: AT&T Intellectual Property L.; L.P., Reno, NV (US)

( * ) Notice: Subject to any disclaimer, the term of this patent is extended or adjusted under 35 U.S.C. 154(b) by 0 days.

(21) Appl. No.: 11/823,078

(22) Filed: Jun. 26, 2007

(65) Prior Publication Data

US 2007/0253494 A1 Nov. 1, 2007

Related U.S. Application Data

(63) Continuation of application No. 10/143,130, filed on May 10, 2002, now Pat. No. 7,266,154.

(51) Int. Cl.
*H04B 3/00* (2006.01)
(52) U.S. Cl. ...................................................... 375/258
(58) Field of Classification Search ................. 375/257, 375/258
See application file for complete search history.

(56) References Cited

U.S. PATENT DOCUMENTS

| | | | |
|---|---|---|---|
| 3,920,925 A | 11/1975 | Lindow | |
| 3,932,713 A | 1/1976 | Fleuchaus et al. | |
| 4,118,603 A | 10/1978 | Kumhyr | |
| 5,956,073 A | 9/1999 | Jin et al. | |
| 6,266,395 B1 | 7/2001 | Liu et al. | |
| 6,370,000 B1 * | 4/2002 | Casey et al. | 361/119 |
| 7,266,154 B2 * | 9/2007 | Gundrum | 375/258 |

FOREIGN PATENT DOCUMENTS

| | | |
|---|---|---|
| FR | 2 697 392 | 10/1992 |
| JP | 621 267 21 A | 6/1987 |
| SU | 1362-491 | 7/1986 |

OTHER PUBLICATIONS

Wayback machine, archived web page—sncmfg.com, http://web.archive.org/web/20010211012502/sncmfg.com/telecom/noise_protection/intinfo.html (Feb. 11, 2001).*

Wayback machine, archived web page—sncmfg.com, http://web.archive.org/web/20010214224442/sncmfg.com/telecom/noise_protection/ten.html (Feb. 12, 2001).*

SNC INT'S—The low-frequency interference solution, SNC Manufacturing Co., Inc. (4 pgs).

(Continued)

*Primary Examiner*—David B Lugo
(74) *Attorney, Agent, or Firm*—Toler Law Group

(57) ABSTRACT

A digital subscriber line (DSL) circuit is disclosed and includes at least one transformer exciting network (TEN) adapted to supply a low-impedance path to ground in response to an excitation current. The excitation current has a non-DSL frequency, and the low-impedance path to ground allows the excitation current to flow through a DSL induction neutralizing transformer (INT). The DSL INT is electrically coupled to the at least one TEN. The DSL INT is adapted to add longitudinal inductance to a telecommunication line in response to the excitation current, wherein the longitudinal inductance suppresses induced harmonic currents.

19 Claims, 4 Drawing Sheets

OTHER PUBLICATIONS

Russ Gundrum, Induction neutralizing transformer can reduce power line disturbances, TELEPHONY, Sep. 8, 1980, (4 pgs).

Inductive Coordination Low Voltage Neutralizing Transformers, Bell System Practices, AT&T Standard, Section 873-505-107, Issue 1, May 1975 (11 pgs).

Russ Gundrum, Power protection —is wire obsolete? Combining old and new technologies may help telcos answer their power protection problems (3 pgs).

Russ Gundrum, Power protection, The use of secondary protectors can help suppress noise-to-ground and fault induced voltages (3 pgs).

Russ Gundrum, Get 'RID' of glitches, With customer-owned equipment and use of telephone lines for data, it is more important than ever to eliminate noise and disturbances, Telephone Engineer & Management, Oct. 15, 1985, (4 pgs).

IEEE Guide for the Implementation of Inductive Coordination Mitigation Techniques and Application, IEEE Communications Society, Jun. 1, 1992, (6 pgs).

Russ Gundrum, abc of the Telephone—Power line interference; problems and solutions, abc TeleTraining, Inc., 1982, vol. 14 (3 pgs).

Multipair induction neutralizing transformers (INTs), abc of the Telephone, Chapter 9, (9 pgs).

SNC HDR—Harmonic Drainage Reactor, www.sncmfg.com, (2 pgs).

Induction Neutralizing Transformers (INTs), "The Economical Solution to Induced AC Voltages, Currents or Harmonics", www.sncmfg.com, (4 pgs).

* cited by examiner

DIGITAL SUBSCRIBER LINE INDUCTION NEUTRALIZING TRANSFORMER NETWORK

CLAIM OF PRIORITY

This application is a Continuation patent application of, and claims priority from, U.S. patent application Ser. No. 10/143,130, filed on May 10, 2002, and entitled "DIGITAL SUBSCRIBER LINE INDUCTION NEUTRALIZING TRANSFORMER NETWORK," which is hereby incorporated by reference in its entirety.

FIELD OF THE DISCLOSURE

The present invention relates generally to data transmission systems, and more particularly, to an apparatus and method of routing digital subscriber line communication signals within a digital subscriber line induction neutralizing transformer network.

BACKGROUND

Demand for high-speed data transmission is ever increasing. Internet access, electronic commerce, Internet protocol telephony, and videoconferencing are telecommunications examples driving such a demand.

Digital subscriber line (DSL) technology provides high-speed data transmission over a so-called "last mile" of "local loop" of a telephone network via copper twisted wire pair cable between residential and small business sites and telephone company central offices and remote terminals. There are various types of DSL such as asymmetric DSL, high bit-rate DSL, single-line DSL, very-high-data-rate DSL, integrated services digital network DSL, and rate-adaptive DSL having various transmission rates, switched circuit characteristics, and other known operation characteristics. These are collectively referred to as XDSL technologies.

In a simplified general view, a DSL system may be considered as a pair of communicating modems, one of which is located at a home or office computer, and the other of which is located at a network control site, typically at a telephone company central office or a remote terminal. The central office or remote terminal modem is connected to some type of network, usually referred to as a backbone network, which is in communication with other communication paths by way of routers or digital subscriber line access multiplexers (DSLAMs). Through DSLAMs the backbone network is able to communicate with dedicated information sources and with the Internet. As a result, information accessible to the backbone network may be communicated between the central office or remote terminal modem and a customer site modem.

DSL applications may be served from central office and remote terminal locations by up to 12,000 feet of copper twisted wire pair cable that may exist between the DSLAM equipment at a central office or remote terminal and a DSL modem at a customer site. However, cable from a remote terminal is typically exposed to a more hostile electrical environment that can cause service reliability problems. These problems become highly prevalent in areas of high earth resistivity, which is usually in soil equal to or greater than 500 meter ohms.

Additionally, although most telecommunication networks have a primary-line protector that is allocated for each customer site as well as for the central offices and remote terminals, the primary-line protector does not protect against induced voltages that are less than 300 volts. Steady-state induced voltages of 20-30 volts can cause signaling and equipment malfunctions to the DSLAM equipment and to the DSL modem as well as reducing advertised transmission line speeds. Worse yet, surge-induced voltages and resulting induced currents exist on the above mentioned wire-line style cable applications when carrying a communication signal between various locations, and may also exist under the operation of the primary-line protector. The surge-induced voltages can cause damage to sensitive electronic components in the DSLAM equipment, such as a line card and the DSL modem equipment, rendering the service inoperable. Also, impulse noise spikes can occur that can reduce the effective speed of the data transmission.

Historically, AC induction problems have come from the long loops serving customers at the ends of an exchange area boundary, which are the most distant customer terminal locations within local calling areas from a central office. These loops are not only predominantly exposed to unbalanced, single phase power lines, but the areas they serve are in suburban/rural environments that are less "built-up", and additional shielding benefits are not available as in urban areas.

Neutralizing transformers were originally designed for use in open wire telephony networks. Large oil-filled neutralizing transformers have been used on wire-line facilities entering power substations and in generating plants to suppress high-induced alternating current (AC) voltages and ground potential rise (GPR). Smaller dry-type neutralizing transformers, known as induction neutralizing transformers (INTs), have been used to reduce voice-frequency noise and induced AC voltages from 350-600 volts on wire-line voice-grade and digital carrier telecommunications circuits.

However, the voice-grade INTs are typically made with up to 500 feet of 26 gauge Category 3 cable, which not only reduces the available transmission overhead margins which limits their application on DSL applications, but also increases the probability of crosstalk coupling interference on adjacent DSL circuits. As the length of a copper pair is extended, the signal power decreases in intensity, thereby, limiting the allowable distance between a customer terminal and a central office or remote terminal. Also, the higher the frequency application, as with DSL, the more noticeable the diminution in signal power. The use of a voice-grade INT reduces signal power approximately 2.3 dB at lower DSL frequencies.

Digital-grade INTs are typically wound with up to 200 feet of 24 gauge Category 3 cable, and are built with a screen (shield) to separate two directions of T1 carrier transmissions, to prevent crosstalk interference. Digital grade INTs exhibit a lower signal power loss over voice-grade INTs, but as with voice-grade INTs they are large, heavy, and expensive units because of the 350-600 volt design criteria. The costs involved in manufacturing and implementing both digital-grade INTs and voice-grade INTs is high. The screen is a significant added cost and is not required in DSL applications.

An additional impairment with high-speed DSL transmission speeds is crosstalk interference between adjacent circuits. The crosstalk can be minimized by using non-adjacent pairs within a binder group. However, the non-adjacent pairs become tightly wound together for several hundred feet in an INT. Coil-winding of the INT tends to spread the Category 3 cable wire pairs out and thus increases the probability of crosstalk interference between the closely coupled pairs.

It would therefore be desirable to develop a high-speed digital telecommunication network containing voltage neutralizing devices that reduce lower level steady-state and surge induced voltages and that are suitable for DSL applications, including being smaller in size, lighter in weight, and less expensive to manufacture and implement as compared to traditional INTs. In so doing, a more reliable telecommunication network is created to satisfy the ever-increasing demand for high-speed communication at customer terminals that are at great distances from a central office.

DETAILED DESCRIPTION OF THE DRAWINGS

Figure 1:
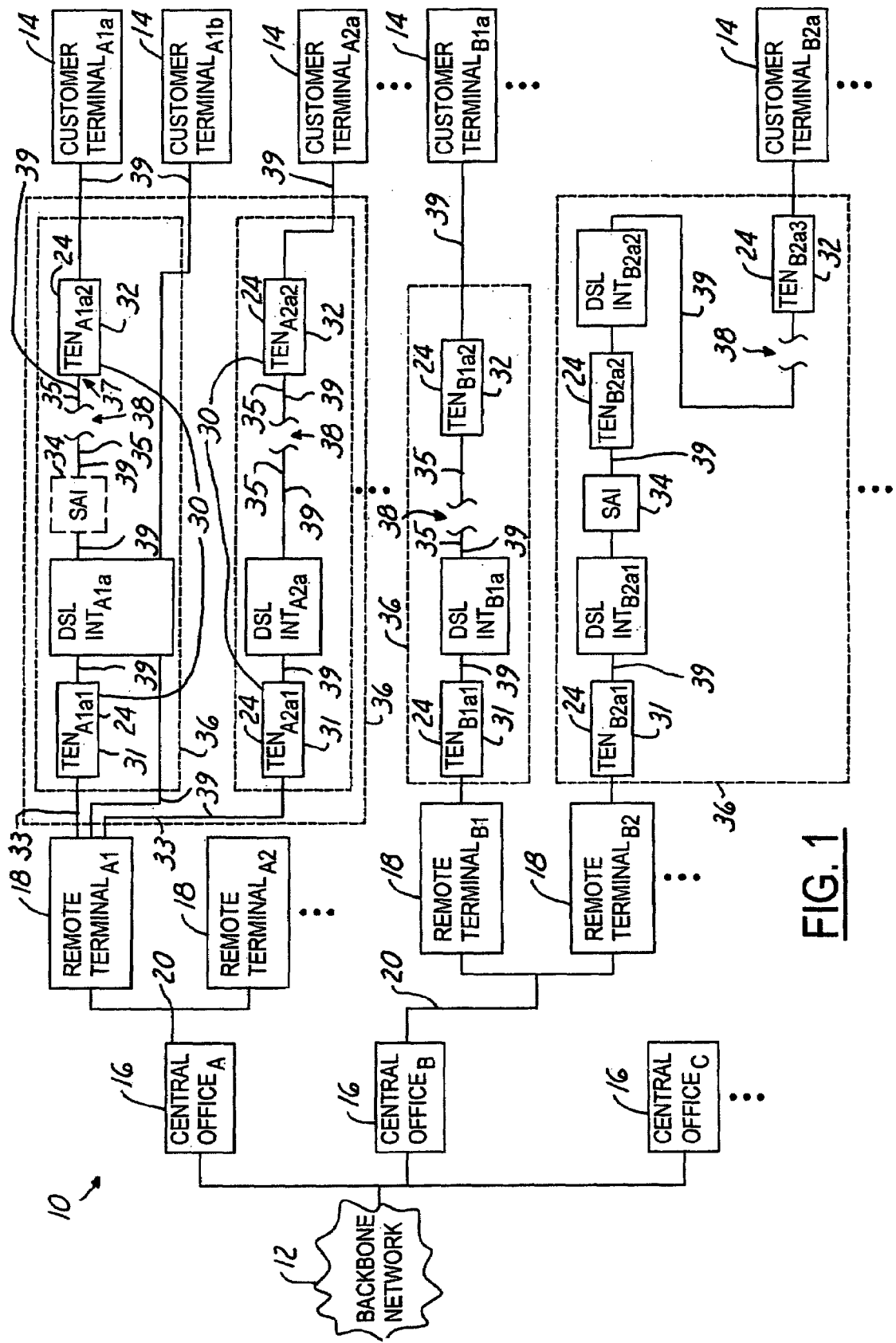
FIG. 1 is a block diagrammatic view of a digital subscriber line (DSL) induction neutralizing transformer (INT) network in accordance with an embodiment of the present invention.

In each of the following figures, the same reference numerals are used to refer to the same components. While the present invention is described with respect to a digital subscriber line (DSL) induction neutralizing transformer (INT) and a DSL INT network including the DSL INT therein for use in a telecommunication system, the present invention may be adapted to be used in various communication systems including: telecommunication systems, DSL systems, high-speed data transmission systems, or other communication systems.

In the following description, various operating parameters and components are described for one constructed embodiment. These specific parameters and components are included as examples and are not meant to be limiting.

Also, in the following description the terms "telecommunication line" refer to any telecommunication signal path medium. Telecommunication line may refer to various telecommunication cables such as fiber optic cable or copper twisted wire pair cable. Telecommunication line may also refer to telecommunication devices located along a telecommunication signal path including central offices, remote terminals, DSL circuits, customer terminals, and other telecommunication devices.

The present invention provides a digital subscriber line (DSL) induction neutralizing transformer (INT) for use in a telecommunication system. The DSL INT includes a core and a coil that is electrically coupled to and wound around the core. The coil includes approximately 100-200 feet of approximately 24-gauge wire. The core and coil add longitudinal inductance to a telecommunication line and reduce induced voltage levels at a non-digital subscriber line frequency on the telecommunication line.

A DSL INT network and a method for providing the same are also provided including one or more remote terminals routing DSL communication signals to a plurality of customer terminals. The INT network also includes one or more DSL circuits. At least one DSL circuit receives an excitation current from the induced voltage levels and includes one or more transformer exciting networks (TENs) that supply one or more low impedance paths-to-ground for the excitation current. A digital subscriber line induction neutralizing transformer is electrically coupled to the one or more transformer exciting networks and neutralizes the induced voltage levels in response to the excitation current.

One of several advantages of the present invention is that it provides an induced voltage neutralizing device that is much smaller in size, lighter in weight, and less expensive to manufacture and implement as compared to traditional INTs.

Another advantage of the present invention is that it provides a hardened network that is capable of providing more reliable high-speed DSL transmissions to customers served at the ends of an exchange area boundary over wire-line facilities.

Furthermore, the present invention provides a high-speed DSL INT network with minimal signal power loss, and eliminates the potential for crosstalk interference. The present invention also provides an apparatus for better neutralizing induced voltages at the power influence harmonic frequencies that can help reduce the effects of impulse noise.

Referring now to FIG. 1, a block diagrammatic view of a DSL INT network 10 in accordance with an embodiment of the present invention, is shown. The DSL INT network 10 includes a backbone network 12 and multiple customer terminals 14. The DSL INT network 10 routes DSL communication signals between the backbone network 12 and the customer terminals 14. The backbone network 12 is electrically coupled to multiple central offices 16 which, in turn, are electrically coupled to multiple remote terminals 18 via fiber optic cables 20. The fiber optic cables 20 allow the remote terminals 18 to be at relatively large distances from the central offices 16 without noise, alternating current (AC) induction, or impedance problems associated with traditional copper twisted wire cables. The remote terminals 18 are electrically coupled to multiple DSL circuits 22, which are electrically coupled to the customer terminals 14. The customer terminals 14 may communicate with the DSL INT network 10 via DSL modems, not shown.

The remote terminals 18 are generally located in a more suburban/rural environment as opposed to the central offices 16, which are located in a more urban environment. The remote terminals 18 in combination with the DSL circuits 22 provide high-speed data transmission to customer terminals 14 at the ends of an exchange area boundary. The remote terminals 18 contain DSL access multiplexer (DSLAM) equipment to provide the DSL service.

The DSL circuits 22 include one or more transformer exciting networks (TENS) 24, preferably two TENs per DSL circuit to protect equipment both at the remote terminals 18 and at the customer terminals 14, as shown with $TEN_{A1a1}$ and $TEN_{A1a2}$ for a first circuit 26, with a DSL INT 28 therebetween. Although a pair of TENs 30, including first TENs 31 and second TENs 32, are illustrated for each DSL circuit 22, various combinations of TENs 24 may be used, depending upon the application. For example, a pair of TENs 24 may be located on one DSL circuit of concern, associated with a specified DSL INT 28, whereas other DSL circuits associated with the specified DSL INT 28 need not contain any TENs 24. This is illustrated by first circuit 26 and customer terminals A1$a$ and A1$b$. The DSL circuit of concern that contains the pair of TENs 30 does not need to be a working circuit or a circuit in servicing operation, but it must have end-to-end continuity from the remote terminal 18 to the far end 37 and to customer terminal 14.

The present invention includes several different DSL INT 28 sizes for the different sized cables that are electrically coupling the various telecommunication devices. For example, cables 33 extending away from the remote terminals 18, towards the customer terminals 14, are known as F1 "feeder cables". The feeder cables are then divided and downsized to smaller F2 "distribution" cables 35 within serving area interface (SAI) cross-connect boxes 34 between the remote terminals 18 and the customer terminals 14. Since the remote terminals 18 are serving smaller subscriber distribution areas in rural environments, the cables 33 may only have 25, 50, or 100 twisted wire pairs per cable as opposed to 300 or more twisted wire pairs as in larger distribution areas. When larger F1 cables are used, multiple DSL INTs 28 are utilized in parallel operation for full count treatment. Note, in order to minimize interference and maximize performance, all twisted wire pairs within a F1 cable are preferably neutralized in order to achieve the best results, especially at power influence and harmonic frequencies and with impulse noise.

In certain applications an additional DSL INT 28 may need to be added between the SAI 34 and a customer terminal 14, as illustrated by DSL $INT_{B2a2}$. For example, the F2 distribution cables 35 are only cross-connected to the F1 feeder cables 33 when a customer subscribes to a DSL service, therefore there may be a small amount of working circuits within the F2 cable 35. Thus, in order to achieve maximum effectiveness, particularly at higher interfering frequencies and with impulse noise, the additional DSL INT may need to be installed so that all twisted wire pairs within the cable 35 become neutralized. When the additional DSL INT is used an additional TEN, such as $TEN_{B2a2}$, is preferably used between the SAI 34 and the DSL $INT_{B2a2}$.

In one embodiment of the present invention the first TEN 31 is installed between the remote terminals 18 and the DSL INT 28. The second TEN 32 is installed at a far end 37 of the cable 35 that is being treated. For multiple paralleling DSL INTs 28 for cables larger than 100 pairs, a pair of TENs 30 is similarly installed to provide the excitation current for each DSL INT 28 for the remaining DSL circuits 22.

The TENs 24 prevent the need for grounding and wasting a valuable, revenue-producing copper pair within a telecommunication cable route in order to make the DSL INT 28 function properly. The TENs 24 provide low impedance paths-to-ground for the necessary excitation current flow through the DSL INT 28. The excitation current is generated by an induced voltage from a paralleling power line to the telecommunication cable. The induced voltage may be on the telecommunications line continuously, due to a steady-state source, or may be surge induced, such as by lightning or a momentary power-line fault. All telecommunication lines within a cable sheath 36 must pass through one or more DSL INTs 28, such as DSL $INT_{A1a}$.

The DSL INTs 28 are preferably located near the remote terminals 18, so as to remove a maximum amount of induced voltage and current from acting on any remote terminal DSLAM equipment or customer terminal DSL modems. The DSL INTs 28 generate a counter electromagnetic field or "bucking" voltage, which is 180° out of phase from the induced voltage, and neutralizes or cancels out the undesired induced voltage.

In another embodiment of the present invention all twisted wire pairs 39 associated with a specific remote terminal 18 extend through a DSL INT 28, whether all corresponding DSL circuits 22 have DSL service or not. This provides additional "full-count" protection for DSLAM line cards that may be within the remote terminals 18. Maximum neutralization effectiveness is achieved when all twisted wire pairs 39 within a telecommunication cable sheath extend through a DSL INT 28, especially when a DSL circuit is experiencing significant noise frequencies or impulse noise spikes.

Additional protection devices, such as primary-line protectors or other protection devices known in the art, may be incorporated throughout the INT network 10. For example, the additional protection devices may be electrically coupled, non-intrusively of a DSL communication signal path, between the DSL INTs 28 and the second TENs 32. However, protection devices are preferably not located at the DSL INTs 28, to prevent electrical shorting out the DSL INTs 28. When a protection device is operated at a DSL INT 28, the protection device circuit location is reverted to ground potential, thereby performing as a TEN. Reverting the protection device circuit location to ground prevents the DSL INT 28 of interest from performing, since there is no excitation current flow through the DSL INT 28.

Figure 2:
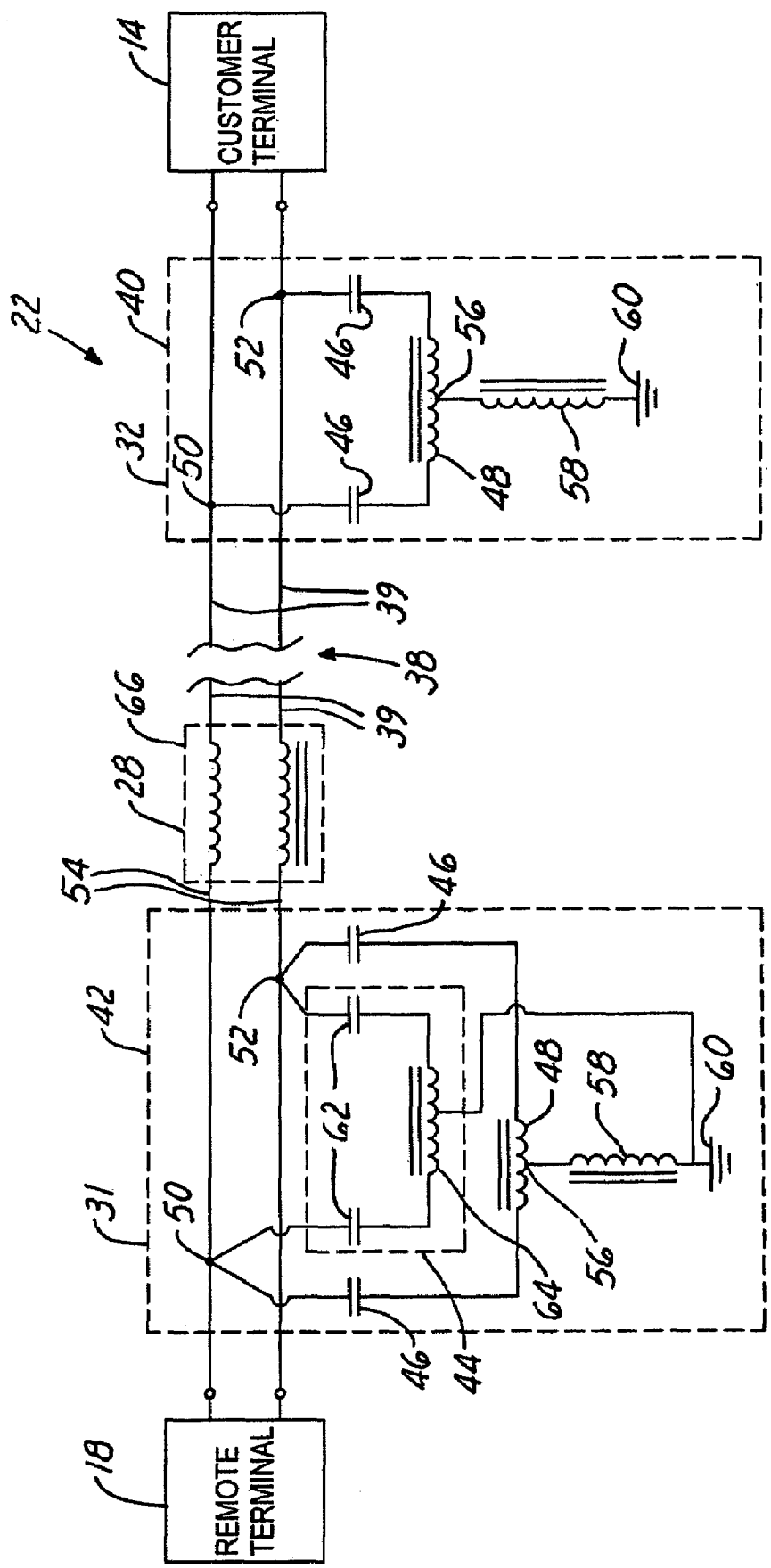
FIG. 2 is a schematic diagram of a DSL circuit in accordance with an embodiment of the present invention.

Referring now to FIG. 2, a schematic diagram of the DSL circuits 22 in accordance with an embodiment of the present invention, is shown.

The TENs 24 may be standard TENs as illustrated by a second TEN circuit 40, representing the second TEN 32, or may be Super TENs as illustrated by a first TEN circuit 42, representing the first TEN 31. A Super TEN is similar to a standard TEN, but includes a harmonic drainage reactor 44. The harmonic drainage reactor 44 drains noise frequency harmonic voltages to ground. The Super TENs act as a broadly tuned filter for removing induced voltages at 50 Hz or 60 Hz frequencies, depending upon the particular country's power line operating frequency, and also the higher voice-frequency (power influence) harmonics. The Super TENs are preferred due to their better filtering performance effectiveness over standard TENs.

The first TEN 31 includes a first pair of capacitors 46 and a first inductor 48 therebetween. The first pair of capacitors 46 are electrically coupled respectively to a first "tip" wire conductor 50 and a first "ring" wire conductor 52 on a telecommunication line 54. A center-tapped terminal 56 of the first inductor 48 is electrically coupled to a second inductor 58, which is then electrically coupled to ground 60. The harmonic drainage reactor 44 includes a second pair of capacitors 62 electrically coupled to a third inductor 64 therebetween, which has a center-tapped terminal 65 electrically coupled to ground 60. The second pair of capacitors 62 are also electrically coupled respectively to the first tip wire conductor 50 and the first ring wire conductor 52.

The DSL INT circuits 22 are designed to substantially reduce and mitigate the non-digital subscriber line frequencies of 50 Hz or 60 Hz, including the harmonic voice frequency interference and impulse noise levels that may fall within the DSL frequency spectrum and cause interference. The DSL INT 28 is represented by a DSL INT circuit 66. The second TEN 32 is illustrated, as stated above, as a standard TEN and is similar to a Super TEN except it does not have the harmonic drainage reactor 44.

Figure 3:
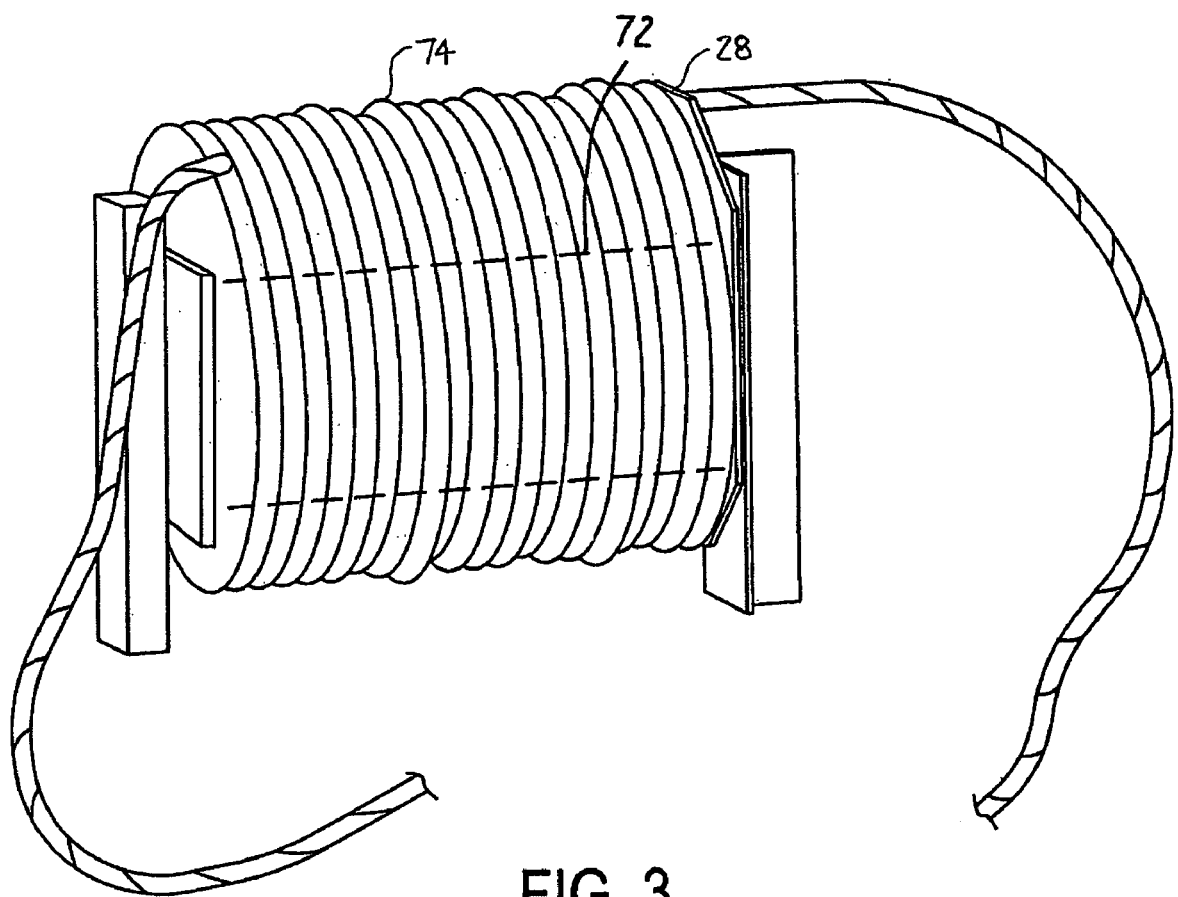
FIG. 3 is a pictorial view of a DSL INT in accordance with an embodiment of the present invention.

Referring now to FIG. 3, a pictorial view of a DSL INT 28 in accordance with an embodiment of the present invention, is shown. The DSL INT 28 includes a permeable ferromagnetic core 72 and a coil 74 wound around the core 72. The core 72 may be formed from a ferromagnetic iron, nickel, or other similar electromagnetic material known in the art. The coil 74 is wound around the core 72 and includes approximately 100-200 feet of category 5 type 24-gauge wire. Depending on the twisted wire pair size of the DSL INT, the core 72 and coil 74 can add approximately 6 to 25 Henries of longitudinal inductance to a typical telecommunication line. Although the coil 74 is formed from category 5 Ethernet-type local area network (LAN) telecommunication cable, which contains tightly twisted wire pairs, other similar cable, known in the art, may be used. The coil 74 has several physical characteristics, some of which include being color-coated, unjacketed, and unshielded. The tightly twisted wire pairs mitigate cross coupling of adjacent high-frequency signals onto surrounding circuits, thus minimizing any crosstalk interference problems.

When the core 72 and coil 74 are excited, via the proper amount of excitation current, the induced voltage levels are reduced at the end of the telecommunication line. The core 72 and the coil 74 will instantaneously neutralize and collect at least 95% of approximately 50-100 volts that have been induced on a telecommunication line, whether the induced voltage is on the line continuously or is on the line for a short duration.

Besides acting as induced voltage neutralizing devices, the DSL INTs 28, also act as induced current limiting devices. In so doing, the DSL INTs 28 reduce increased induced current magnitudes in a telecommunication line due to the use of the fiber optic cable 20 rather than traditional copper twisted wire pair cable between the central offices 16 and the remote terminals 18. Moreover, the DSL INTs 28 add high longitudinal impedance to the DSL circuits 22, which effectively reduces the harmonic induced current flow which can cause noise interference.

Although not necessary, the DSL INT 28 can be designed to be packaged in the form of a direct-burial unit for a number of construction, aesthetic, safety and maintenance reasons, which are known in the art.

Figure 4:
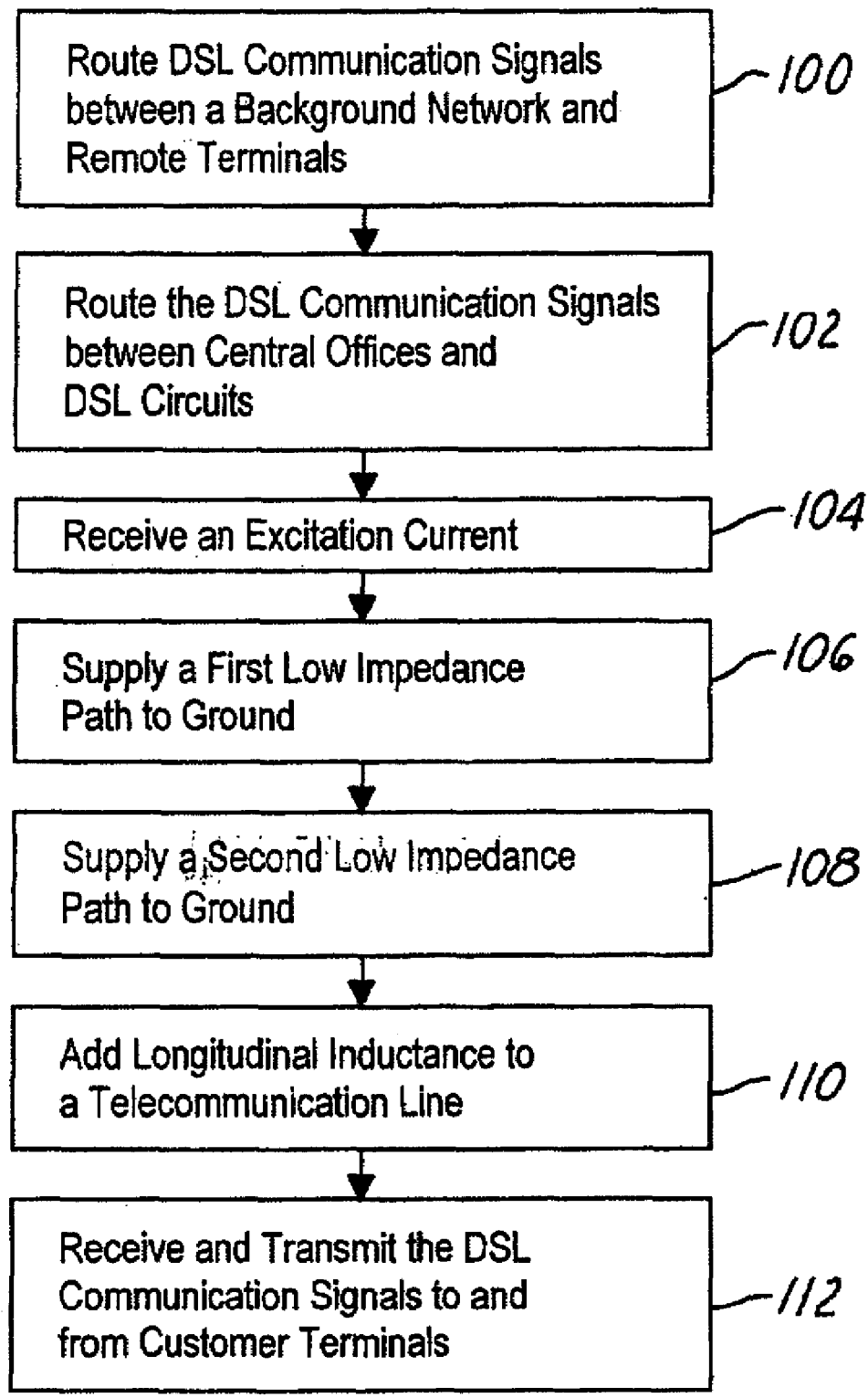
FIG. 4 is a logic flow diagram illustrating a method of routing DSL communication signals within the DSL INT network.

Referring now to FIG. 4, a logic flow diagram illustrating a method of routing DSL communication signals within the INT network 10, is shown.

In step 100, the central offices 16 route the DSL communication signals between the backbone network 12 and the remote terminals 18.

In step 102, the remote terminals 18 route the DSL communication signals between the central offices 16 and the DSL circuits 22.

In step 104, at least one DSL circuit receives an excitation current having a non-digital subscriber line frequency. The non-digital subscriber line frequency may be a frequency equal to 50 Hz or 60 Hz, as stated above.

In step 106, the first TENs 31 supply the first low impedance paths-to-ground, thereby allowing the necessary induced current to flow through the DSL INT 28.

In step 108, the second TENs 32 supply second low impedance paths-to-ground at the far ends 37 of the cable route being treated.

In step 110, the DSL INTs 28 add from 6 to 25 Henries of longitudinal inductance to a telecommunication line in response to the excitation current to suppress induced harmonic currents that can cause noise interference. When exciting currents are high enough, the DSL INT 28 neutralizes 60 Hz induced voltages as follows: 5 ma @ 20 volts, 10 ma @ 40 volts and 20 ma (100 volts, for example.

In step 112, the customer terminals 14 receive and transmit the DSL communication signals to and from the DSL circuits 22.

The above-described steps are meant to be an illustrative example, the steps may be performed synchronously or in a different order depending upon the application.

The present invention increases operational reliability and decreases the amount of malfunctions of remote terminal DSLAM equipment and customer DSL modems and protects these devices from being damaged by interfering power sources and lightning surges. Additionally, there is a significant reduction in induced power influence or harmonic voltages and currents and impulse noise that can cause circuit interruptions and slower data transmission rates. Resulting signal-to-noise ratio improvements allow for longer DSL circuit applications, in turn resulting in greater numbers of customer terminals that may be serviced.

The above-described apparatus, to one skilled in the art, is capable of being adapted for various purposes and is not limited to the following systems: automotive vehicle systems, control systems, communication systems, or other communication systems. The above-described invention may also be varied without deviating from the spirit and scope of the invention as contemplated by the following claims.

What is claimed is:

1. A digital subscriber line (DSL) circuit, comprising:
at least one transformer exciting network (TEN) adapted to supply a low-impedance path to ground in response to an excitation current, wherein the excitation current has a non-DSL frequency, and wherein the low-impedance path to ground allows the excitation current to flow through a DSL induction neutralizing transformer (INT);
wherein the DSL INT is electrically coupled to the at least one TEN, the DSL INT adapted to add longitudinal inductance to a telecommunication line in response to the excitation current, wherein the longitudinal inductance suppresses induced harmonic currents and wherein the DSL INT includes:
a coil electrically coupled to and wound around a core, the coil including approximately 100-200 feet of approximately 24 gauge wire;
wherein the core and the coil are adapted to add the longitudinal inductance to the telecommunication line;
and wherein the DSL INT does not include a screen or shield to prevent crosstalk interference.

2. The DSL circuit of claim 1, wherein the DSL INT is coupled between a first TEN and a second TEN.

3. The DSL circuit of claim 2, wherein the first TEN includes an interface to receive the excitation current from a remote terminal.

4. The DSL circuit of claim 3, wherein a plurality of twisted wire pairs associated with the remote terminal extend though the DSL INT.

5. The DSL circuit of claim 4, wherein the plurality of twisted wire pairs includes all twisted wire pairs associated with the remote terminal.

6. The DSL circuit of claim 2, wherein the second TEN includes an interface to send and receive DSL communication signals with at least one customer terminal.

7. The DSL circuit of claim 6, wherein a serving area interface (SAI) is coupled between the DSL INT and the second TEN.

8. The DSL circuit of claim 2, further comprising a second DSL INT coupled to the second TEN.

9. The DSL circuit of claim 8, furthers comprising a third TEN coupled to the second DSL INT, the third TEN adapted to communicate with a customer terminal.

10. The DSL circuit of claim 1, further comprising at least one protection device.

11. The DSL circuit of claim 10, wherein the at least one protection device includes a primary-line protector.

12. The DSL circuit of claim 1, further comprising multiple DSL INTs operating in parallel.

13. A method of routing digital subscriber line (DSL) communication signals, the method comprising:
receiving an excitation current at a DSL circuit including a first transformer exciting network (TEN), a second TEN, and a DSL inductance neutralizing transformer (DSL INT), wherein the DSL INT includes:

a coil electrically coupled to and wound around a core, the coil comprising approximately 100-200 feet of approximately 24 gauge wire;

wherein the core and the coil are adapted to add longitudinal inductance to a telecommunication line and reduce an induced voltage level at a non-digital subscriber line frequency on the telecommunication line;

and wherein the DSL INT does not include a screen or shield to prevent crosstalk interference;

supplying a first low impedance path-to-ground for the excitation current via the first TEN;

supplying a second low impedance path-to-ground for the excitation current via the second TEN;

and neutralizing the induced voltage level in response to the excitation current via the DSL INT.

14. The method of claim 13, wherein the excitation current is generated by the induced voltage and wherein the induced voltage is received from a parallel power line to a telecommunication cable, wherein the telecommunication cable includes the telecommunication line.

15. The method of claim 14, wherein the DSL INT generates a counter electromagnetic field that is out of phase from the induced voltage.

16. The method of claim 13, wherein the first TEN, the second TEN and the DSL INT are included in a non-operational DSL circuit.

17. The method of claim 13, wherein the first TEN receives the excitation current from a remote terminal that includes a digital subscriber line access multiplexer (DSLAM) device.

18. The method of claim 17, further comprising substantially isolating the induced voltage from the DSLAM device via the DSL INT.

19. The method of claim 13, further comprising receiving at least one DSL communication signal at the DSL circuit and routing the at least one DSL communication signal to at least one customer terminal via the second TEN.

* * * * *